United States Patent [19]

Ikeura

[11] 4,378,770

[45] Apr. 5, 1983

[54] METHOD AND APPARATUS FOR IGNITION SYSTEM SPARK TIMING CONTROL DURING ENGINE CRANKING

[75] Inventor: Kenji Ikeura, Yokosuka, Japan

[73] Assignee: Nissan Motor Co., Ltd., Yokohama, Japan

[21] Appl. No.: 387,277

[22] Filed: Jun. 10, 1982

Related U.S. Application Data

[63] Continuation of Ser. No. 137,001, Apr. 3, 1980, abandoned.

[30] Foreign Application Priority Data

Apr. 16, 1979 [JP]   Japan ................................. 54-45323

[51] Int. Cl.$^3$ ............................................. F02P 5/04
[52] U.S. Cl. ................................. 123/424; 123/416; 123/417; 123/418
[58] Field of Search ............... 123/417, 418, 424, 416, 123/179 BG

[56] References Cited

U.S. PATENT DOCUMENTS

| | | |
|---|---|---|
| 3,788,290 | 1/1974 | Carter . |
| 3,853,103 | 12/1974 | Wahl et al. . |
| 3,969,614 | 7/1976 | Moyer et al. . |
| 4,009,378 | 2/1977 | Sakamoto ............................ 123/418 |
| 4,009,699 | 3/1977 | Hetzler et al. . |
| 4,015,565 | 4/1977 | Aono et al. . |
| 4,104,998 | 8/1978 | Fenn ..................................... 123/424 |
| 4,133,325 | 1/1979 | West .................................... 123/424 |
| 4,142,489 | 3/1979 | Menard . |
| 4,157,699 | 6/1979 | Mori .................................... 123/424 |
| 4,196,705 | 4/1980 | Hattori . |
| 4,198,941 | 4/1980 | Oishi ................................... 123/424 |
| 4,201,159 | 5/1980 | Kawai et al. ........................ 123/417 |
| 4,204,256 | 5/1980 | Klotzner . |
| 4,236,214 | 11/1980 | Sasayama . |
| 4,244,023 | 1/1981 | Johnson .............................. 123/417 |

FOREIGN PATENT DOCUMENTS

| | | |
|---|---|---|
| 1539242 | 6/1970 | Fed. Rep. of Germany . |
| 2645642 | 4/1977 | Fed. Rep. of Germany . |
| 2801641 | 7/1978 | Fed. Rep. of Germany . |
| 2823659 | 12/1978 | Fed. Rep. of Germany . |
| 2732781 | 2/1979 | Fed. Rep. of Germany . |
| 1247738 | 9/1971 | United Kingdom . |
| 1247739 | 9/1971 | United Kingdom . |
| 1262450 | 2/1972 | United Kingdom . |
| 1285106 | 8/1972 | United Kingdom . |
| 1428520 | 3/1976 | United Kingdom . |
| 2042637 | 9/1980 | United Kingdom ................ 123/417 |
| 2042638 | 9/1980 | United Kingdom ................ 123/424 |

*Primary Examiner*—P. S. Lall
*Attorney, Agent, or Firm*—Lane, Aitken & Kananen

[57] ABSTRACT

A method and apparatus for controlling ignition system spark timing. Engine revolution speed is sensed and whether the engine is under cranking or not is sensed. Correction means are provided which, when the engine is under cranking and at the same time the engine speed is lower than a predetermined value, decreases spark advance to small values in accordance with a drop in the engine speed. A digital computer is used to calculate the preferred spark advance values in the preferred embodiment.

14 Claims, 6 Drawing Figures

METHOD AND APPARATUS FOR IGNITION SYSTEM SPARK TIMING CONTROL DURING ENGINE CRANKING

CROSS-REFERENCES TO RELATED APPLICATIONS

This application is a continuation of application Ser. No. 137,001, filed Apr. 3, 1980, now abandoned.

References are made to the following related co-pending applications, each filed in the name of Kenji Ikeura on Apr. 3, 1980:
(1) U.S. patent application Ser. No. 136,959;
(2) U.S. patent application Ser. No. 137,000;
(3) U.S. patent application Ser. No. 136,996; and
(4) U.S. patent application Ser. No. 136,994, now U.S. Pat. No. 4,314,540, issued Feb. 9, 1982.

BACKGROUND OF THE INVENTION

The present invention relates to a method and apparatus for the control of an ignition system spark timing for a spark ignition internal combustion engine, and more particularly to a method and apparatus for the control of an ignition system spark timing during cranking of a spark ignition internal combustion engine.

Description is now provided concerning the conventional art and the problems associated therewith. The spark timing control device of an internal combustion engine adjusts the timing of spark to a certain degree before the top dead center (for example, 12° C. BTDC/600 rpm) so as to cause the ignition to take place at the optimum instance to provide the maximum output because there is an ignition delay from the passage of a spark to the actual ignition of the fuel within the cylinder of the engine. The ignition delay in terms of time is substantially unchanged even if the engine revolution speed increases, but if it is considered in terms of crank angle, the ignition delay increases in accordance with an increase in the engine revolution speed because the piston speed increases in accordance with the increase in engine revolution speed. Thus, a centrifugal spark advance unit of the mechanical type, for example, is operatively connected to a distributor, thereby to advance the spark timing in accordance with an increase in the revolution speed because if the spark timing remains at the same level as that for the low revolution speed, an adequate output characteristic can not be provided when the revolution speed increases.

FIGS. 1 and 2 are graphs showing spark advance characteristics provided by the conventional devices wherein the axis of abscissa designates engine revolution speed and the axis of ordinate designates spark advance value. The reference letter $N_1$ designates a revolution speed beyond or above which the spark advance value starts to increase, and the letter $N_2$ designates a revolution speed beyond or above which the spark advance value becomes maximum. In the case of FIG. 1, the characteristic features in that the spark advance value linearly increases as the revolution speed increases when the revolution speed is between $N_1$ and $N_2$. In the case of FIG. 2, the characteristic features in that the gradient of a slope between $N_1$ and $N_2$ changes at $N_3$. In both of the cases, spark advance values within a low revolution speed range below $N_1$ and within a high revolution speed range above $N_2$ are constant, thereby to maintain the spark advance constant irrespective of the variation in the revolution speed. The letter $N_4$ designates the idle revolution speed. As will be understood from an observation of the characteristics shown in FIGS. 1 and 2, according to the conventional devices, the spark advance value remains constant when the engine is under cranking, so that there is a problem that if the cranking speed is low, the ignition resulting from the passage of a spark causes a torque tending not to rotate the engine crankshaft in the forward direction, but to rotate in the reverse direction, thereby to deteriorate the engine start-up performance when the atmospheric temperature is low and the battery voltage is low.

SUMMARY OF THE INVENTION

An object of the present invention is to improve start-up of a spark ignition internal combustion engine when the engine is under cranking even if the cranking speed is very low. The method and apparatus provide a control wherein, when the cranking speed is low, the value of spark advance is decreased in accordance with a drop in engine revolution speed.

The method and apparatus of the invention concerns the control wherein it is detected whether a spark ignition internal combustion engine is under cranking or not, and the revolution or cranking speed of the engine is sensed, and, when the engine is under cranking and at the same time the cranking speed is lower than a predetermined engine revolution value, the value of spark advance is decreased in accordance with a drop in the cranking speed.

The invention may be better understood by reference to the detailed description which follows and to the drawings.

DETAILED DESCRIPTION OF THE INVENTION

Figure 3:
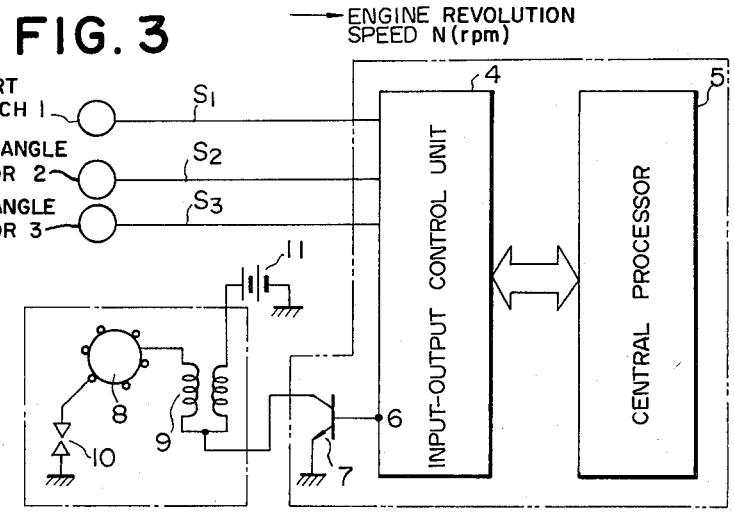
FIG. 3 is a block diagram illustrating one embodiment of the present invention.

FIG. 3 is a block diagram showing a preferred embodiment of the present invention. In FIG. 3, the reference numeral 1 designates a start switch which provides an ON or OFF signal $S_1$ in response to whether an engine is under cranking or not. The numeral 2 designates a basic angle sensor which provides basic angle pulses $S_2$ each upon an expiration of a basic angle (for example, 120°) as the crank shaft rotates, and numeral 3 designates a unit angle sensor which provides unit angle pulses $S_3$ each upon an expiration of a unit angle (for example, 1°) as the crank shaft rotates. The revolution speed of the engine is found based upon the signal $S_3$ from the unit angle sensor 3. These signal $S_1$ to $S_3$ (if necessary, other signals including a signal corresponding to engine induction vacuum and pulse signals for fuel injection may be used) are read in via an input-output control unit 4 that is constructed of semiconductors by a central processor 5 including a ROM (read only memory), a RAM (random access memory), and a CPU (central processor unit). From the read signals $S_1$ to $S_3$, the central processor 5 detects whether the engine is under cranking or not, finds by calculation or table look-up a spark advance value, and instructs this value to that section of the input-output control unit 4 which performs spark advance control. The input-output control unit 4 provides, at a spark output terminal 6, an output that carries information that current be passed or interrupted for a spark based upon the signals $S_2$ and $S_3$ of the basic angle sensor 2 and the unit angle sensor 3 and the instructed spark advance value, thereby controlling the operation of a transistor 7 which turns on or off electric current passing through an ignition coil 9 of an ignition system as enclosed by the rectangular one-dot chain line shown in FIG. 3. The numeral 8 designates a distributor, the numeral 10 designates a spark plug, and the numeral 11 designates a battery for a source of electricity. Owing to the benefit of recent progress in semiconductor techniques, it has been possible to easily manufacture and use a unit integrally combining a central processor 5 with an input-output control unit 4 and which also has a built-in transistor 7, as shown in the two-dot chain line box of FIG. 3.

Figure 4:
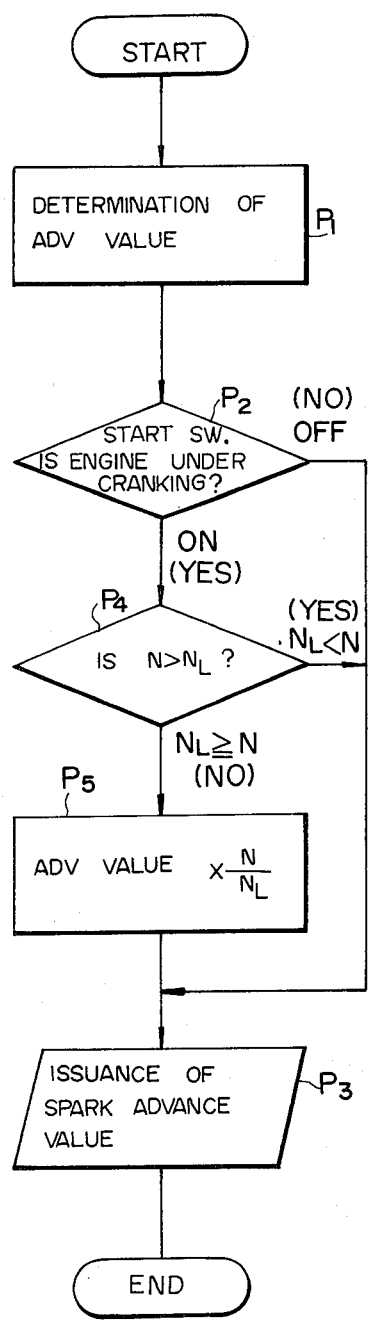
FIG. 4 is a flow chart illustrative of the operation of the digital microcomputer used to determine the value of spark advance.
Figure 5:
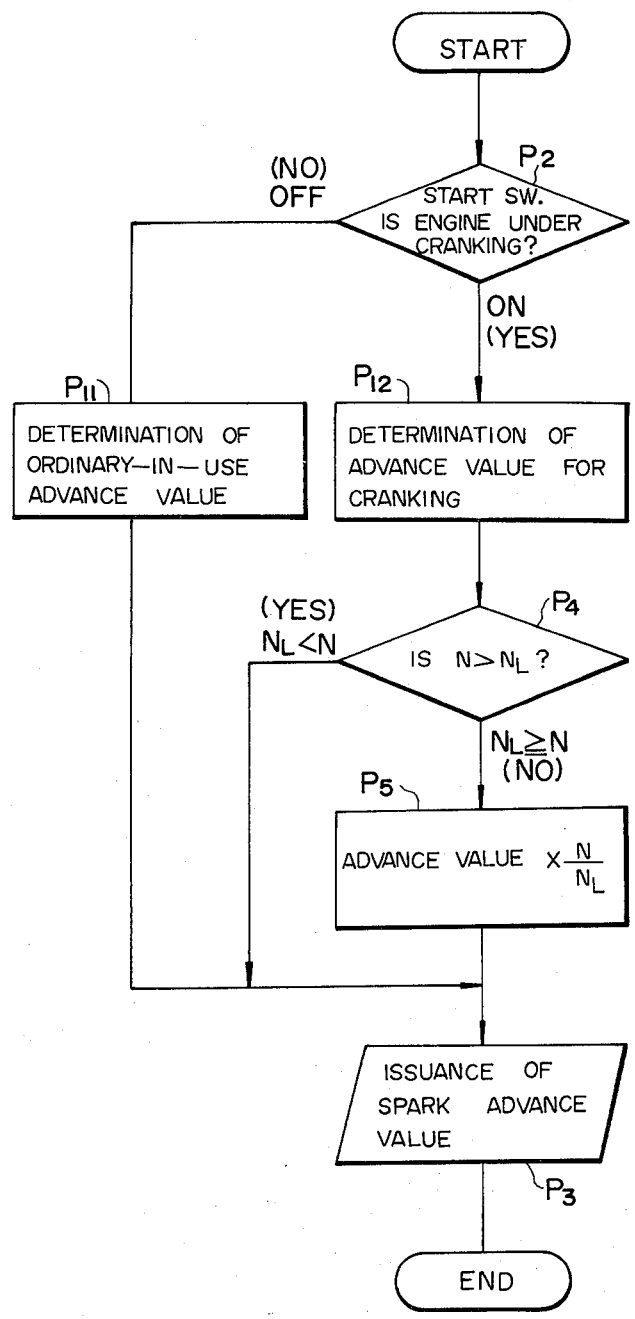
FIG. 5 is a flow chart illustrative of the operation of the digital microcomputer used to determine the value of spark advance.

FIGS. 4 and 5 show flow charts illustrative of the operation of the central processor 5 from a determination of spark advance value to the output thereof. FIG. 4 is a flow chart wherein the same spark advance characteristic is employed for engine cranking and for normal or ordinary-in-use engine operation, while FIG. 5 is a flow chart wherein distinct spark advance characteristics are used for engine cranking and for normal or ordinary-in-use engine operation, respectively. Referring to FIG. 4, when the program starts, the basic spark advance value (abbreviated hereinafter as ADV) is determined based upon engine revolution speed, load, and other factors in a step $P_1$. In a step $P_2$ it is decided the ON or OFF state of the start switch 1 whether the engine is under cranking or not. If the start switch 1 is in an OFF state, the engine is not under cranking so that the program goes to a step $P_3$ to provide the ADV value found in the step $P_1$. If the start switch 1 is in an ON state, the engine is under cranking so that the program goes the step from $P_2$ to a step $P_4$ wherein it is decided whether the engine revolution speed N is higher than a predetermined value $N_L$ or lower than the value $N_L$. If $N > N_L$, the program goes from $P_4$ to $P_3$ wherein the spark advance value found in the previous step $P_1$ is issued as an output. If $N \leq N_L$ as a result of the decision in the step $P_4$, the program goes to the step $P_5$ wherein the ADV value is multiplied by a coefficient that is proportional to the engine revolution speed N and is sent to step $P_3$ for issuance. Therefore, the spark advance value is rendered small when $N/N_L \leq 1$.

According to the operation shown in the flow chart shown in FIG. 5, it is decided in step $P_2$ whether the start switch 1 is in an ON state or in an OFF state and if the start switch 1 is in an ON state thereby to indicate that the engine is under cranking, the program goes to the step $P_{12}$, while, if the start switch 1 is in an OFF state, the program goes to the step $P_{11}$. In the step $P_{11}$, a spark advance value for ordinary-in-use engine operation is found based upon the engine revolution speed and load and the result is issued via step $P_3$. In the step $P_{12}$, a spark advance value for the engine cranking is found and the program goes to the step $P_4$. The program after the step $P_4$ inclusive is the same as that of the case shown in FIG. 4; that is, if the comparison of N with $N_L$ shows that $N \leq N_L$, the step goes to the step $P_5$ wherein the ADV value found in the step $P_{12}$ is multiplied with $N/N_L$ and this result is issued via step $P_3$.

Hereinafter the meaning of the operation described in connection with FIGS. 4 and 5 is explained. Properly speaking, the spark advance value should be adjusted, taking as a correction factor into account the time delay from the passage of a spark to the actual ignition such that at the optimum instance after the top dead center, the combustion pressure becomes maximum, thereby to give rise to the efficient conversion from thermal energy to torque. In this respect, ADV value should be given by spark advance time rather than by crank angle.

Since, in ordinary-in-use operating ranges, the engine revolution speed is relatively stable, it can be considered that the advance angle is equal to the advance time. Considering that parts of engine main portion are designed to move in a timed relation with the crank angle, it is most convenient and practical to give an advance value by the crank angle.

However, to give a spark advance by the crank angle is inconvenient upon engine cranking, particularly under cold start-up when the engine revolution speeds are excessively low. If, for example, a spark advance of 18° is optimum for an engine revolution speed of 120 rpm, this spark advance value corresponds to 25 milliseconds before top dead center in terms of time. This spark advance value of 18° corresponds to 50 milliseconds before top dead center when the engine revolution speed is only 60 rpm, thus giving a spark too early to allow the combustion pressure to become maximum before the top dead center, causing reverse rotation or suspension of rotation, with the result that the engine fails to start. If, for the purpose of avoiding it, the spark advance value is set excessively small, enough torque fails to be produced, causing the engine to fail to start.

To solve this problem, when the cranking or engine speed N is lower than the predetermined value $N_L$, a spark advance time before top dead center becomes constant by, according to the present invention, multiplying the optimum ADV value for the speed $N_L$ with a coefficient $N/N_L$, thereby attaining the most effective conversion from combustion pressure to torque to enable optimum engine start-up.

Figure 1:
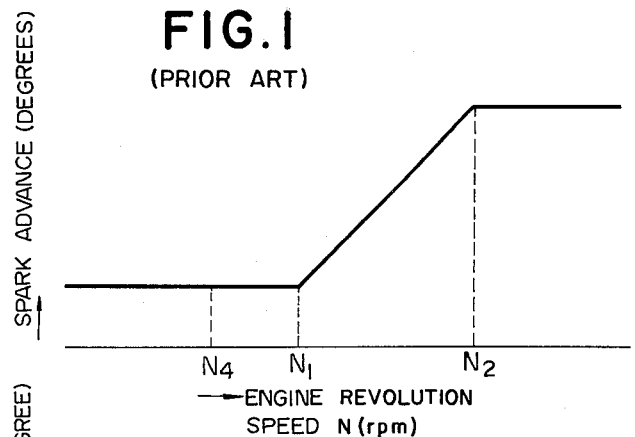
FIGS. 1 and 2 are graphs of engine-speed spark-advance versus engine speed according to the conventional art.
Figure 2:
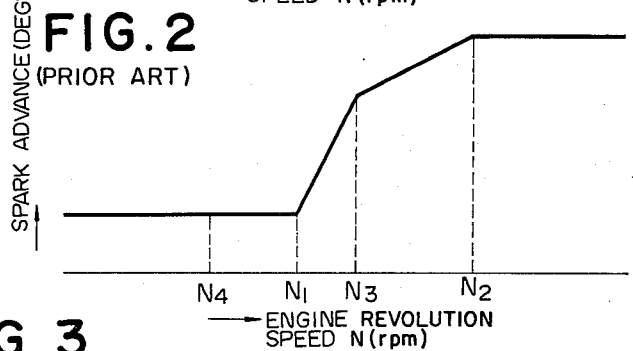
Figure 6:
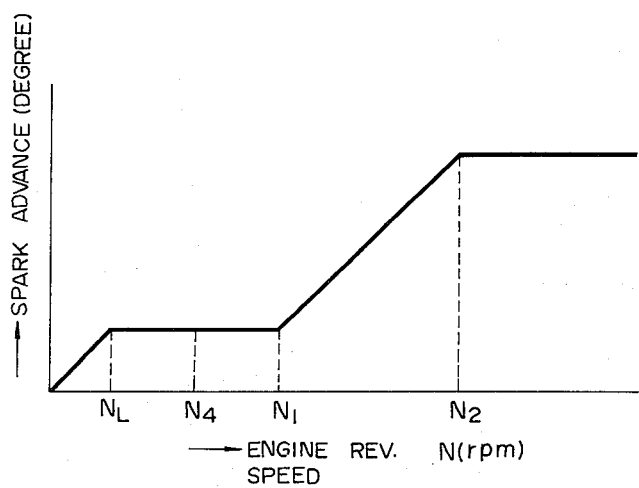
FIG. 6 is a graph of engine-speed spark-advance versus engine speed N of the present invention.

The reason why such correction of the spark advance value is unnecessary when $N > N_L$ is that when the cranking speed N is relatively high, the other environmental conditions such as spark energy and fuel atomization are favourable and in a direction tending to decrease the combustion delay, thus rendering the correction of spark advance angle unnecessary. Another reason is that startup of the engine is not affected even if the spark advance is not minutely set when the cranking speed is sufficiently high, and if, actually, the spark advance is minutely set, a reaction takes place such as an occurrence of knocking after the completion of combustion. It is appropriate that the predetermined value $N_L$ be a value corresponding to a value within a range from 60 rpm to 200 rpm. FIG. 6 shows engine-speed spark-advance versus engine revolution speed N, wherein $N_L$ designates the predetermined value, while $N_1$, $N_2$, $N_4$ designate revolution speed values having similar meanings to the counterparts shown in FIG. 1.

In the description regarding the embodiment the case was explained wherein the microcomputer constructed of semiconductors is used to calculate $ADV \times N/N_L$, but the present invention is not limited to this application and the spark advance characteristic as shown in FIG. 6 can be attained with a centrifugal spark advance device used in the conventional distributor.

However, if a microcomputer system is already employed, the present invention can be embodied with a slight addition of a program, thus practicing the invention without any substantial cost increase. If a centrifugal spark advance mechanism of the conventional distributor is used to practice the invention, the invention can be embodied and adaptable to almost all kinds of conventional internal combustion engines with substantially acceptable cost increase.

It will now be understood that since, according to the present invention, when the cranking speed N is lower than a predetermined value $N_L$ upon cranking of the engine, the spark advance is rendered small, and reverse revolution of the engine is prevented even when the cranking speed is low so that effective conversion from the combustion pressure to torque takes place, thus providing good start-up performance.

In the practice of the invention, the inventor has used a Hitachi Model No. HD 46802 central processor. A Hitachi Model No. HD 46506 input-output control unit compatible with the processor has been used.

The start switch 1 is entirely conventional and may be a pair of contacts which are closed while the engine starter motor is in operation.

The basic angle sensor and unit angle sensor are also conventional and may be in the form of a detecting unit 24 described in U.S. Pat. No. 4,015,565, filed Apr. 5, 1977 in the name of Aono et al. and entitled "SPARK-ADVANCE CONTROL APPARATUS FOR INTERNAL COMBUSTION ENGINE" (which is herein incorporated by reference) or may be in the form of a speed-electrical transducer 10 described in U.S. Pat. No. 3,853,103, filed Dec. 10, 1974 in the name of Wahl et al. (assignee: Robert Bosch GmbH) and entitled "IGNITION TIMING CONTROL SYSTEM FOR INTERNAL COMBUSTION ENGINE IGNITION SYSTEMS," (which is also incorporated by reference).

A way to find or sense the revolution speed of the engine, i.e., engine rpm, based upon a signal from the unit angle sensor is conventional and described in the above-mentioned U.S. Pat. No. 3,853,103. In this respect, reference is made to U.S. Pat. No. 3,969,614, filed July 13, 1976 in the name of Moyer et al. and entitled "METHOD AND APPARATUS FOR ENGINE CONTROL" and reference is also made to U.S. Pat. No. 4,009,699, filed Mar. 1, 1977 in the name of Hetzler et al. and entitled "DIGITAL IGNITION SPARK TIMING ANGLE CONTROL WITH READ ONLY MEMORY."

The inventor has used a breakerless ignition system employing an ignition coil and a power transistor.

A way to determine the instance of ignition based upon binary signals of the basic angle sensor and the unit angle sensor is disclosed in U.S. Pat. No. 3,853,103 in the name of Wahl et al. and U.S. Pat. No. 4,015,565 in the name of Aono et al.

In a four-cylinder, four-cycle internal combustion engine, each one ignition pulse must be obtained after each revolution of the crank shaft by i.e. at 180°; 180° after the first ignition pulse is derived, a second basic angle pulse must then be provided by the basic angle sensor. In this case, the basic angle sensor must be designed to provide a basic angle pulse after each revolution of the crank shaft by 180°.

In a six-cylinder, four-cycle internal combustion engine, each one ignition pulse must be obtained after each revolution of the crank shaft by i.e. at 120°; 120° after the first ignition pulse is derived, a second basic angle pulse must then be provided by the basic angle sensor. In this case, the basic angle sensor must be designed to provide a basic angle pulse after each revolution of the crank shaft by 120°.

What is claimed is:

1. A method for the control of an ignition system spark timing for a spark ignition internal combustion engine having an idle speed, said method comprising the steps of:
   detecting a cranking condition wherein the engine is under cranking and generating a cranking condition signal indicative of the cranking condition;
   detecting cranking speed of the engine and generating a cranking speed signal indicative of the cranking speed; and
   decreasing, in response to the cranking condition signal and the cranking speed signal, the value of spark advance in accordance with a drop in the detected cranking speed of the engine when the engine is under cranking and at the same time the detected cranking speed is lower than a predetermined value which is lower than the idle speed.

2. A method as claimed in claim 1, wherein the step of decreasing the value of spark advance comprises the steps of:
   calculating $A_{NL} \times N/N_L$ to provide a result, where, $A_{NL}$ is the value of spark advance when the cranking speed is equal to said predetermined value $N_L$, and N represents the cranking speed of the engine, and
   providing said result as an output value of the spark advance for the cranking speed N of the engine.

3. A method as claimed in claim 1 or 2, wherein the step of decreasing the value of spark advance includes a digital operation by a microcomputer.

4. A method as claimed in claim 3, wherein, in said step of decreasing the value of spark advance, said predetermined value of the cranking speed is a value corresponding to a value of engine revolution speed between 60 rpm and 200 rpm, and, when the cranking speed of the engine is lower than said predetermined value, the spark advance is decreased to a value such that the time period from the passage of a spark to the top dead center is constant.

5. An apparatus for the control of an ignition system for a spark ignition internal combustion engine having an idle speed, said apparatus comprising:
   an engine cranking sensor for detecting a cranking condition wherein the engine is under cranking and generating a cranking condition signal indicative of the cranking condition;
   an engine revolution speed sensor for detecting cranking speed of the engine and generating a cranking speed signal indicative of the cranking speed of the engine; and
   correction means, in response to the cranking condition signal and the cranking speed signal, for decreasing the value of spark advance in accordance with a drop in the detected cranking speed of the engine when the engine is under cranking and at the same time the detected cranking speed is lower than a predetermined value which is lower than the idle speed.

6. An apparatus as claimed in claim 5, wherein said correction means calculates $A_{NL} \times N/N_L$ to provide a result, where, $A_{NL}$ is the value of the spark advance when the cranking speed is equal to said predetermined value $N_L$, and N represents the cranking speed of the engine, and said correction means provides said result as an output value of the spark advance for a cranking speed N of the engine.

7. An apparatus as claimed in claim 5 or 6, wherein said correction means is in the form of a microcomputer which performs a digital operation to determine the value of spark advance.

8. An apparatus as claimed in claim 7, wherein said predetermined value of the cranking speed is a value corresponding to a value of engine revolution speed between 60 rpm and 200 rpm, and said correction means decreases the spark advance, when the cranking speed of the engine is lower than said predetermined value, to a value such that the time period from the passage of a spark to the top dead center is constant.

9. An apparatus as claimed in claim 7, wherein said engine cranking sensor includes a start switch which provides an ON or OFF signal in response to whether the engine is under cranking or not.

10. An apparatus as claimed in claim 7, wherein said engine revolution speed sensor includes a basic angle sensor which provides basic angle pulses each upon an expiration of a basic angle as the crank shaft rotates, and a unit angle sensor which provides unit angle pulses each upon an expiration of a unit angle as the crank shaft rotates.

11. A method of controlling the ignition spark timing of an internal combustion engine having an idle speed comprising:

detecting the revolution speed of the engine and generating a revolution speed signal indicative of the revolution speed of the engine;

detecting a cranking condition wherein the engine is being cranked by detecting if the start switch of the engine is on, and a cranking condition signal indicative of the cranking condition, changing, in response to the revolution speed signal and the cranking condition signal, the spark advance of the engine in accordance with the detected revolution speed of the engine, by controlling the spark advance when (a) the engine is rotating between a zero and a first predetermined engine revolution speed which is lower than the idle speed during cranking, by retarding the spark advance proportionally to the actual revolution speed of the engine divided by said first predetermined engine revolution speed and (b) when the engine is rotating between said first predetermined engine revolution speed and a second predetermined revolution speed which is higher than said first predetermined engine revolution speed and higher than the idle speed, by maintaining the spark advance constant.

12. A method as set forth in claim 11, wherein said step of controlling is carried out by a microcomputer which performs a table look-up in a ROM in which a plurality of values of spark advance, which correspond to a plurality of corresponding engine revolution speeds, are stored, the spark advance values corresponding to engine revolution speeds between zero and said first predetermined engine revolution speed increasing at a rate proportional to the actual engine revolution speed divided by said first predetermined engine revolution speed, and the values between said first predetermined engine revolution speed and said second predetermined engine revolution speed being constant.

13. An apparatus for controlling the ignition spark timing of an internal combustion engine having a start switch and an idle speed, comprising:

means for detecting the revolution speed of the engine and generating a revolution speed signal indicative of the revolution speed of the engine;

means for detecting a cranking condition wherein the engine is being cranked, said means detecting if said start switch of the engine is on, said detecting means generating a cranking condition signal indicative of the cranking condition;

means, in response to the revolution speed signal and the cranking condition signal, for changing the spark advance of the engine when it is being cranked in accordance with the detected revolution speed of the engine, said changing means controlling the spark advance when (a) the engine is rotating between a zero and a first predetermined engine revolution speed which is lower than the idle speed during cranking, by retarding the spark advance proportionally to the actual revolution speed of the engine divided by said first predetermined engine revolution speed and (b) when the engine is rotating between said first predetermined engine revolution speed and a second predetermined engine revolution speed which is higher than the idle speed, by maintaining the spark advance constant.

14. An apparatus as claimed in claim 13, wherein said controlling means includes a microcomputer which performs a table look-up in a ROM in which a plurality of values of spark advance which correspond to a plurality of corresponding engine revolution speeds, are stored, the spark advance values corresponding to engine revolution speeds between zero and said first predetermined engine revolution speed increasing at a rate proportional to the actual engine speed divided by said first predetermined engine revolution speed, and the values between said first predetermined engine revolution speed and said second predetermined engine revolution speed being constant.

* * * * *